(12) United States Patent
Swanson

(10) Patent No.: US 8,511,241 B2
(45) Date of Patent: Aug. 20, 2013

(54) NON-SINGULATING AIR SEEDER PROVIDING PRECISE SEED PLACEMENT

(75) Inventor: Guy J. Swanson, Spokane, WA (US)

(73) Assignee: Exactrix LLC, Spokane, WA (US)

(*) Notice: Subject to any disclaimer, the term of this patent is extended or adjusted under 35 U.S.C. 154(b) by 334 days.

(21) Appl. No.: 12/897,609

(22) Filed: Oct. 4, 2010

(65) Prior Publication Data
US 2012/0079973 A1 Apr. 5, 2012

(51) Int. Cl.
*A01C 15/00* (2006.01)
*A01C 7/06* (2006.01)
*A01B 15/16* (2006.01)
*A01B 15/18* (2006.01)
*A01B 23/06* (2006.01)
*A01B 25/00* (2006.01)

(52) U.S. Cl.
USPC ........... 111/167; 111/176; 111/192; 111/194; 111/129; 111/119; 111/121; 172/558; 172/610

(58) Field of Classification Search
USPC ................. 111/174–176, 149, 157, 163–170, 111/190–195, 118, 126, 129; 172/558–560, 172/518, 606–610
See application file for complete search history.

(56) References Cited

U.S. PATENT DOCUMENTS

| | | | |
|---|---|---|---|
| 5,140,917 A | 8/1992 | Swanson | |
| 6,032,593 A | 3/2000 | Wendling et al. | |
| 6,283,049 B1 | 9/2001 | Swanson | |
| 6,360,681 B2 | 3/2002 | Swanson | |
| 6,484,653 B2 | 11/2002 | Swanson | |
| 6,622,939 B2 | 9/2003 | Swanson | |
| 7,004,090 B2 | 2/2006 | Swanson | |
| 7,152,539 B2 | 12/2006 | Swanson | |
| 7,540,246 B2 | 6/2009 | Friesen et al. | |
| 7,568,438 B2 | 8/2009 | Arksey | |
| 7,938,072 B2 * | 5/2011 | Wilhelmi et al. | 111/174 |

OTHER PUBLICATIONS

Bourgault, Product Catalogue 2011(dated May 2010).
D-Cup Diffuser, D-Cup Diffuser.com (downloaded Mar. 26, 2010) at http://www.d-cupdiffuser.com/.
D-Cup diffusers vs dutch seed brakes, No-Till Talk (downloaded Mar. 26, 2010) at http://www.notilltalk.org/mbbs22/forums/threadview.asp?tid=482&mid=2499.
Exactrix Global Systems; Ron Swindler; Pioneer No-Till Farmer (downloaded Mar. 25, 2010) available at http://www.exactrix.com/RS.pdf.

* cited by examiner

*Primary Examiner* — Christopher J Novosad
(74) *Attorney, Agent, or Firm* — Hovey Williams LLP

(57) ABSTRACT

A furrow opener is operable as part of a nonsingulating air seeder and includes a rotatable disc to open a furrow. The opener also includes a vented seed catch pan positioned adjacent one side of the disc. The catch pan is operably coupled to a seed conduit of the air seeder to receive seed in a pressurized air stream from the seed conduit. The catch pan presents a seed inlet configured to receive seed from the seed conduit, a seed outlet positioned to deposit the seed within the furrow, and an elongated chamber extending between the inlet and outlet. The catch pan presents multiple vents spaced between the inlet and outlet, with the vents allowing pressurized air flow to escape from the chamber to ambient without passing through the outlet.

20 Claims, 12 Drawing Sheets

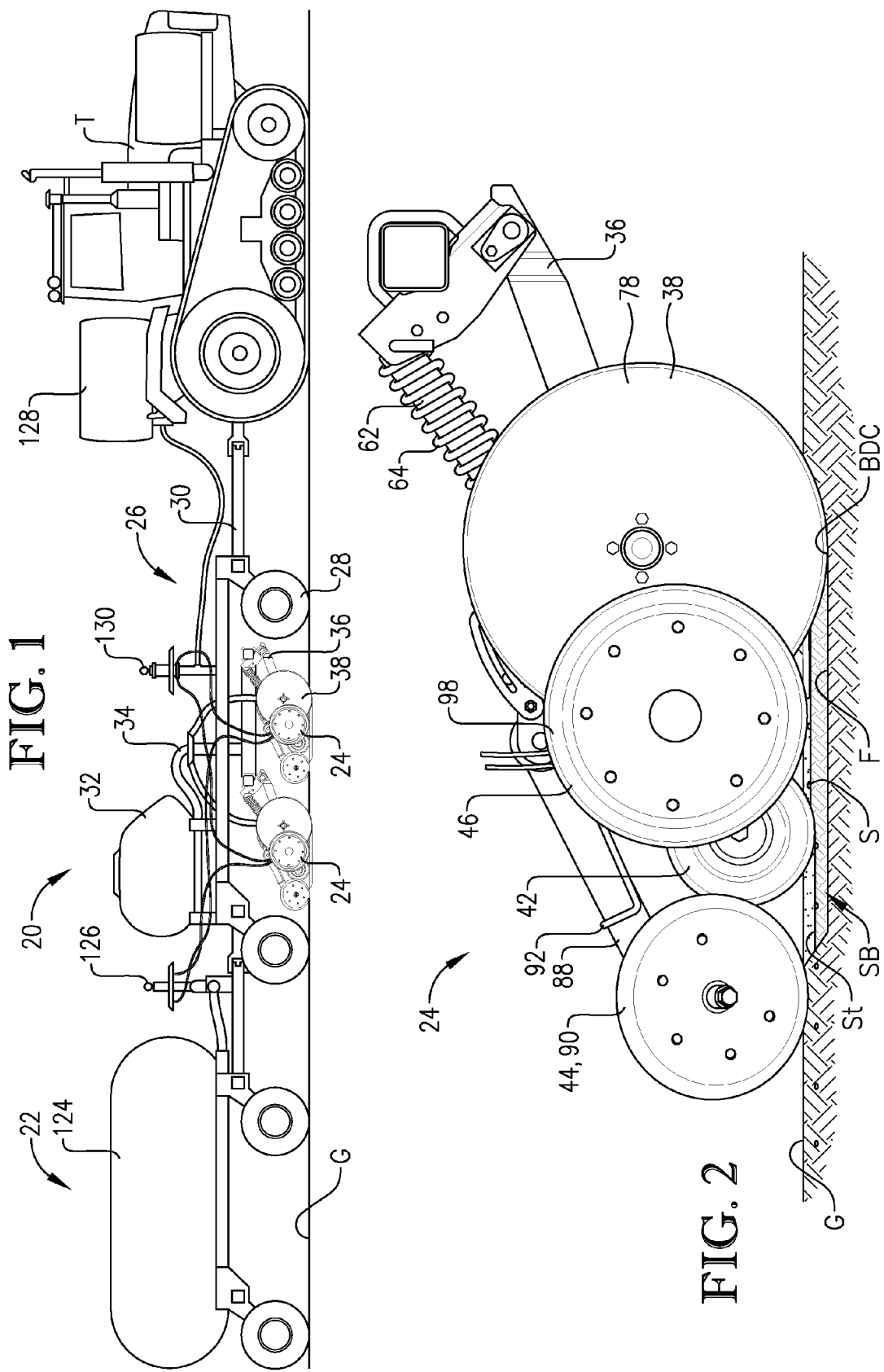

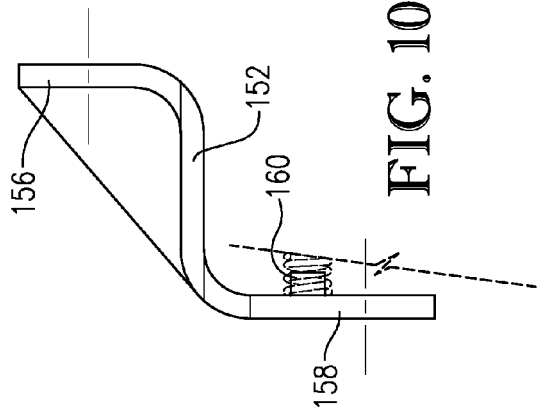
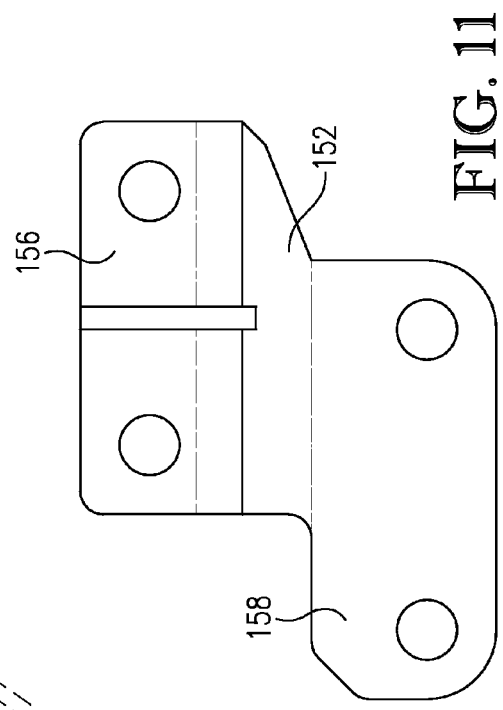
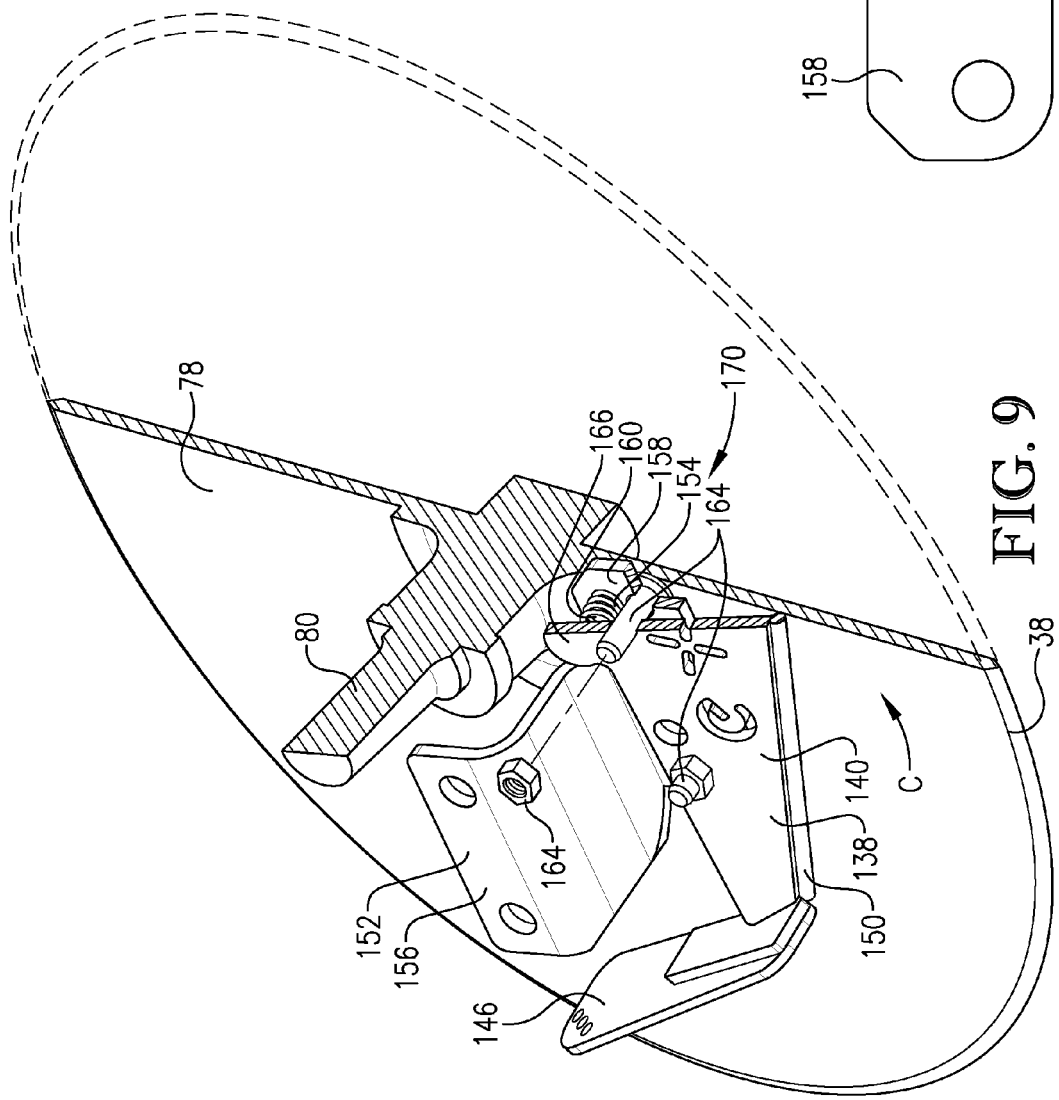

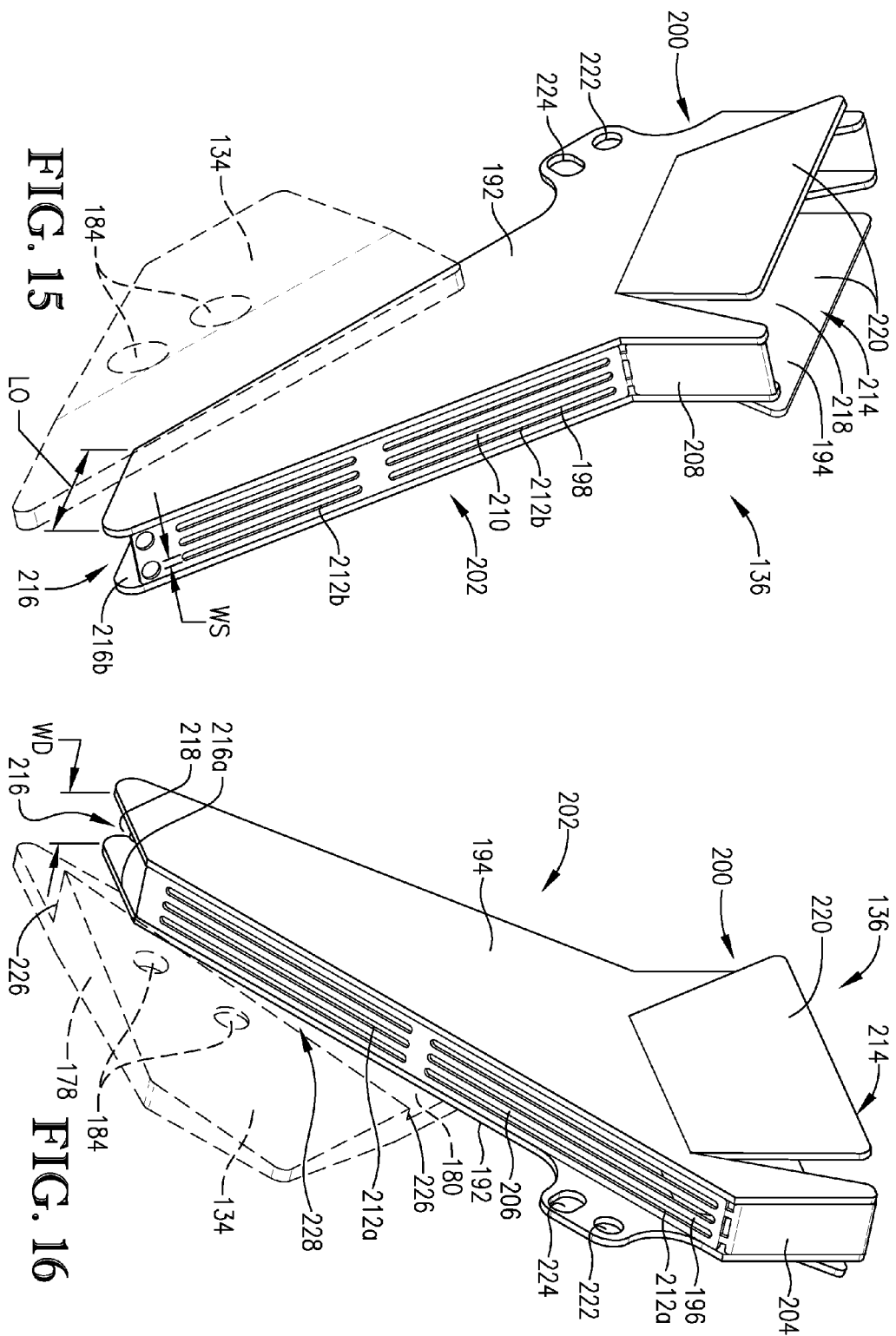

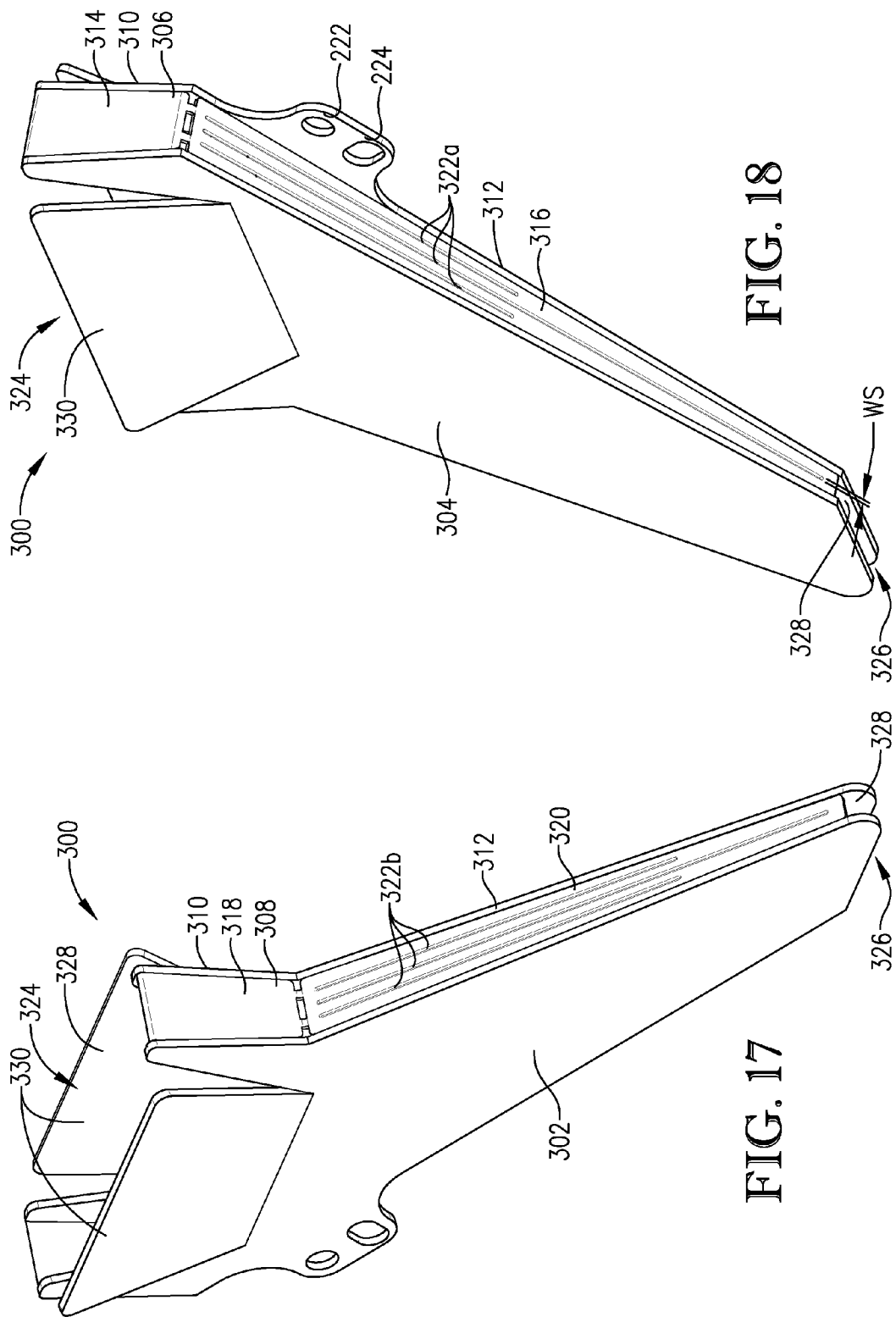

NON-SINGULATING AIR SEEDER PROVIDING PRECISE SEED PLACEMENT

BACKGROUND

1. Field

The present invention relates generally to air seeders. More specifically, embodiments of the present invention concern a non-singulating air seeder with a seed catch pan, soil firming element, and a floating scraper.

2. Discussion of Prior Art

Conventional no-till planting equipment includes a rotatable disc opener that opens a furrow while minimally disturbing stubble or other organic matter along the field. One type of drill used for no-till operations includes the air seeder. Air seeders include multiple opener units that are supplied with seed via a pneumatic seed-conveying system. Prior art no-till equipment are also often designed to provide various types of fertilizer placement. For instance, fertilizer can be applied by either top-dressing or banding techniques. Fertilizer banding is performed by placing fertilizer in the ground prior to planting (i.e., pre-plant banding), during planting, or after planting. Fertilizer can be applied using various application methods such as mid-row banding, paired row banding, or cross row feeding.

Prior art air seeding equipment suffers from various limitations. For example, air seeders use high-velocity air to distribute seed through tubes to various openers. The high-velocity air, while providing efficient seed delivery, violently delivers seed to the opened furrow. Thus, seed is delivered at a velocity that causes imprecise seed placement within the furrow. Moreover, the air velocity can cause delivered seed to bounce out of the furrow entirely. Such imprecise seed placement causes plants to emerge at different times. Prior art air seeders are also deficient because air velocity cannot be controlled at different locations along the field. Furthermore, conventional air seeders are ineffective at simultaneously depositing seed and inoculant in powder form.

SUMMARY

The following brief summary is provided to indicate the nature of the subject matter disclosed herein. While certain aspects of the present invention are described below, the summary is not intended to limit the scope of the present invention.

Embodiments of the present invention provide an air seeder that does not suffer from the problems and limitations of the prior art air seeders set forth above.

A first aspect of the present invention concerns a furrow opener operable as part of a nonsingulating air seeder. The furrow opener broadly includes a rotatable disc and a vented seed catch pan. The rotatable disc is operable to be pulled over ground in a forward direction to thereby open a furrow. The vented seed catch pan is positioned adjacent one side of the disc and is operable to insert seed in the furrow. The vented seed catch pan is configured to be operably coupled to a seed conduit of the air seeder to receive seed in a pressurized air flow from the seed conduit. The vented seed catch pan presents a seed inlet configured to receive seed from the seed conduit, a seed outlet positioned to deposit the seed within the furrow, and an elongated chamber extending between the inlet and outlet. The vented seed catch pan presents multiple vents spaced between the inlet and outlet. The vents are positioned between the inlet and outlet and thereby allow pressurized air flow to escape from the chamber to ambient without passing through the outlet.

A second aspect of the present invention concerns a furrow opener operable as part of a nonsingulating air seeder to deposit seed distributed from a seed conduit of the air seeder by pressurized air flow. The furrow opener broadly includes a drawbar assembly, a rotatable disc, and a seed placement assembly. The rotatable disc is operable to be pulled over ground in a forward direction to thereby open a furrow. The seed placement assembly is supported by the drawbar assembly to one side of the disc and is operable to insert seed in the furrow. The seed placement assembly includes a vented seed catch pan and a soil firming element located adjacent the furrow. The vented seed catch pan is configured to be operably coupled to a lowermost end of the seed conduit. The firming element is located in front of the catch pan along the forward direction to form a seed bed that receives seed in the furrow. The furrow opener includes a fertilizer injector for discharging fertilizer into the furrow. The vented seed catch pan and said soil firming element are removable from the drawbar assembly so that the furrow opener is operable to provide fertilizer banding without simultaneous air seeding.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a right side elevation of a tractor pulling a two-gang air seeder and a fertilizer cart, with the air seeder including a plurality of single disc openers constructed in accordance with a first embodiment of the present invention;

FIG. 2 is a right side elevation of one of the single disc openers shown in FIG. 1, with the single disc opener being attached to a tool bar of the air seeder;

FIG. 9 is a fragmentary perspective of the disc assembly and floating placement assembly shown in FIGS. 2 and 4-7, with the disc and floating placement assemblies being cross sectioned to show the installation of the spring between the frame mounting bracket and the support frame, with the support frame being in scraping engagement with the rotatable disc of disc assembly;

FIG. 10 is a rear elevation of the frame mounting bracket and spring shown in FIGS. 8 and 9;

FIG. 11 is a side elevation of the frame mounting bracket shown in FIGS. 8-10;

Figures 13, 14:
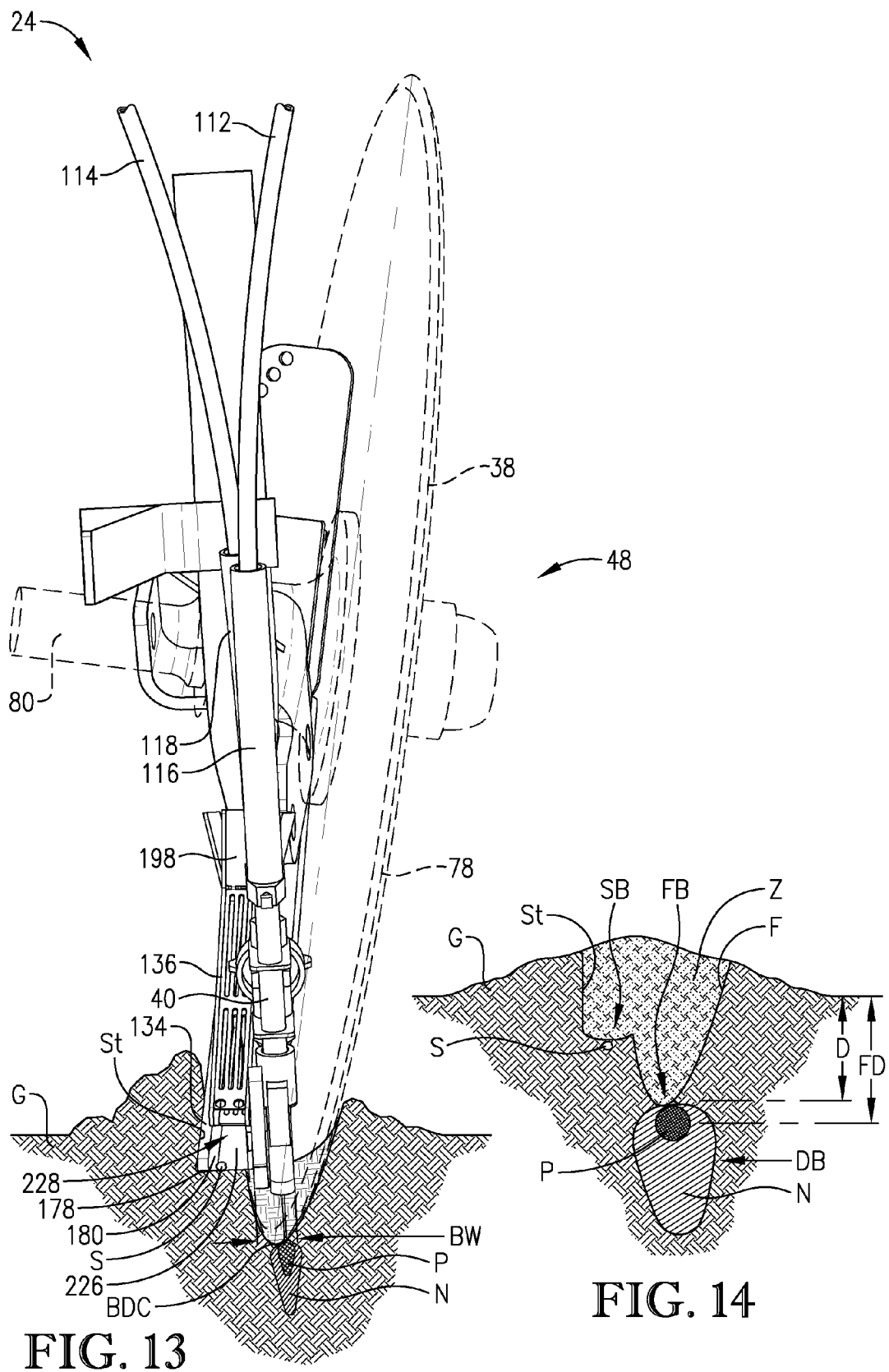

FIG. 13 is a fragmentary rear elevation of the single disc opener shown in FIGS. 2 and 4-7, showing the relative position of the vented seed catch pan, firming wedge, fertilizer injectors, and support frame relative to the rotatable disc as the single disc opener is moved through the ground so that the disc assembly can open a furrow, the fertilizer assembly can inject the fertilizer band at the bottom of the furrow, and the placement assembly can form the seed bed and deposit seed in the seed bed;

FIG. 14 is a rear elevation of the furrow similar to FIG. 13, but showing the furrow after the opener has injected fertilizer and deposited seed, the firming wheel has pressed the seed into the seed bed, and the closing wheel has closed the furrow;

FIG. 15 is a left rear perspective of the vented seed catch pan shown in FIGS. 2 and 4-7, showing front and rear walls and side walls that cooperatively define a funnel section of the catch pan and a rearwardly declining section that depends from the funnel section, with the walls cooperatively presenting an inlet and outlet of the catch pan, and with the rear wall presenting a plurality of elongated rear vents that extend vertically between the inlet and outlet, and further showing the firming wedge in phantom lines;

FIG. 16 is a right front perspective of the vented seed catch pan shown in FIG. 15, showing the front wall presenting a plurality of elongated front vents that extend vertically between the inlet and outlet; and further showing the firming wedge in phantom lines;

FIG. 17 is a left rear perspective of an alternative vented seed catch pan constructed in accordance with a second embodiment of the present invention, showing front and rear walls and side walls that cooperatively define an alternative funnel section and an alternative rearwardly declining section that depends from the funnel section, with the walls cooperatively presenting an inlet and outlet of the alternative catch pan, and with the rear wall presenting a plurality of alternative rear vents that extend vertically between the inlet and outlet; and FIG. 18 is a right front perspective of the alternative vented seed catch pan shown in FIG. 17, showing the front wall presenting a plurality of alternative front vents that extend vertically between the inlet and outlet.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 3:
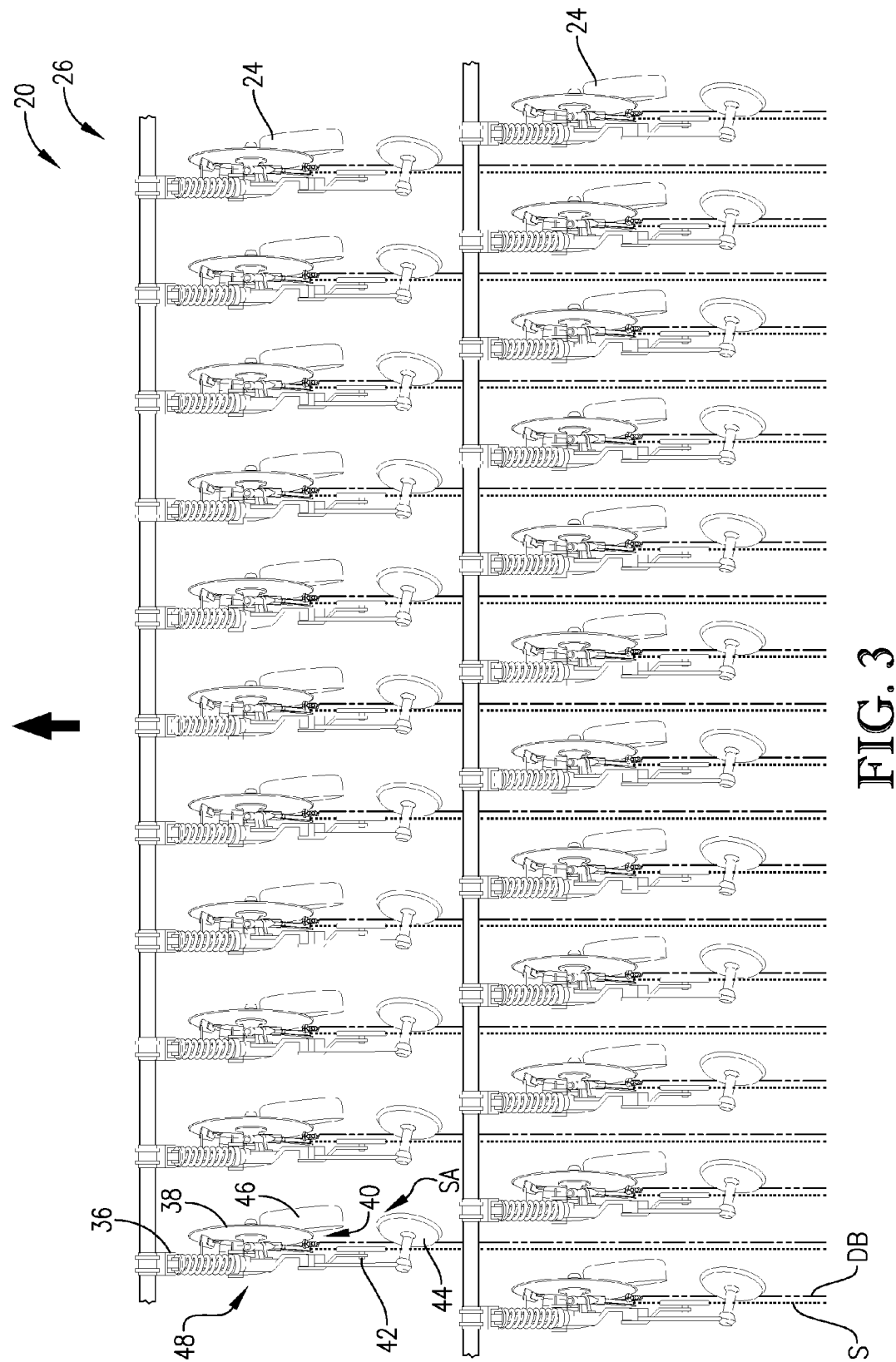
FIG. 3 is a fragmentary plan view of the air seeder shown in FIG. 1, showing the location of dedicated bands of fertilizer along each seed row.

Turning initially to FIGS. 1-3, an air seeder 20 and fertilizer cart 22 are pulled by a tractor T through a field G. The illustrated air seeder 20 and cart 22 are used to distribute seed and fertilizer along the field G, preferably as part of a no-till program that causes only minimal soil disturbance. As will be shown, the illustrated embodiment is particularly configured to adapt an air seeder for precise seed placement. The illustrated system is also preferably configured to inject nitrogen, phosphorus, sulfur, and zinc in a dual-shot application. However, the principles of the present invention are applicable to other seeding and/or fertilizer applications where a furrow is opened for placement of seed and/or fertilizer. The air seeder 20 and cart 22 are preferably pulled by tractor T, but could be pulled by another suitable powered vehicle. While the illustrated system is preferred for drilling of small grains, such as mustard, canola, or alfalfa, other grains such as wheat or garbanzo beans can be planted with the air seeder 20.

The illustrated seeder 20 is a two-gang, double-winged seeder configured to draw sixty-four openers 24 spaced on seven and one-half inch centers. However, as will be further described below, the layout of the plurality of openers 24 could be variously configured in any manner known in the art, including any alternative suitable numbers, spacing, and ranking of the openers. In one manner well known in the art, the seeder 20 includes a two gang, winged frame assembly 26 adjustably supported by a plurality of road wheels 28 and coupled to the tractor T by a floating hitch 30. As will become apparent, virtually any conventional seeder could be modified with the inventive openers 24 described in detail below. One such seeder that could be modified according to the illustrated embodiment is the Case SDX air seeder, although the openers 24 could be incorporated into other seeding equipment.

The seeder 20 further includes a seed tank 32 that holds seed S for planting and a hose 34 that delivers seed S from the tank 32 to openers 24. As will be discussed, the seed S is directed from the tank 32, via the hose 34, to a seed tube of each opener 24, and then to a vented catch pan.

Figure 4:
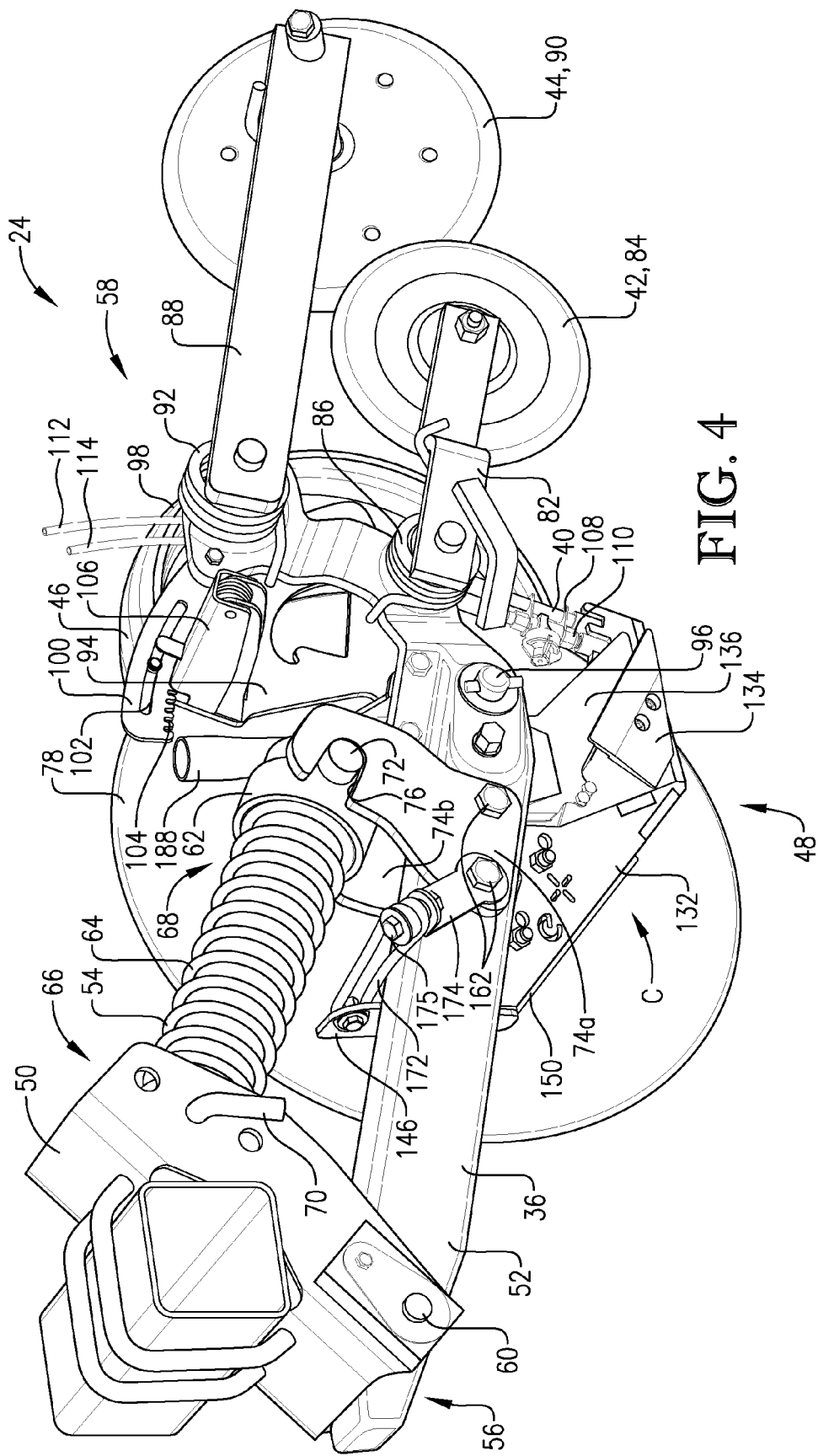
FIG. 4 is a front left perspective of the single disc opener shown in FIG. 2, with the opener including a drawbar assembly, disc assembly, fertilizer injector assembly, firming wheel assembly, closing wheel assembly, gauge wheel assembly, and floating placement assembly.

Turning to FIGS. 2-4, each opener 24 preferably includes a drawbar assembly 36, a disc assembly 38, a fertilizer injector assembly 40, a firming wheel assembly 42, a closing wheel assembly 44, gauge wheel assembly 46, and a floating placement assembly 48. As will be discussed, a disc of disc assembly 38 is pulled by and urged into the field G by the drawbar assembly 36 in an operating position. The disc cuts through the field G to fracture the ground and create an elongated furrow F that is configured to receive seed and fertilizer. The floating placement assembly 48 is also configured to form a slot St within the furrow F. The slot St includes a generally flat shelf that receives seed S and extends alongside the furrow F. The opener 24 is preferably adjustable so that the bottom dead center location BDC of the disc can be moved to adjust the furrow depth. The illustrated opener 24 is preferably a right opener, with the rotatable disc generally angled to the right of the furrow F. However, the openers 24 could include left openers or a combination of left and right openers.

Turning to FIGS. 2-7, the drawbar assembly 36 has a conventional construction that supports and positions the remaining opener components. The drawbar assembly 36 preferably includes a bracket 50, arm 52, and spring assembly 54. The arm 50 is elongated and presents fore and aft ends 56,58. As will be discussed, components of the disc assembly 38, firming wheel assembly 42, closing wheel assembly 44, gauge wheel assembly 46, and floating placement assembly 48 are attached along and supported by the arm 52. The bracket 50 and arm 52 are preferably pivotally connected by a pin at a joint 60 adjacent the fore end 56 so that the arm 52 can pivot generally up and down about a lateral axis of the pin. The aft end 58 of arm 52 can pivot downwardly until a stop provided by the fore end 56 engages a stop provided by the bracket 50.

The spring assembly 54 includes a housing 62 and a spring 64 received on the housing 62. The housing 62 includes opposite fore and aft ends 66,68, with the fore end 66 being removably pivotally attached to the bracket 50 with a pin 70. The aft end 68 includes a pin 72 that is removably received by brackets 74a,b. The brackets 74 each include an open slot 76 that receives the pin 72. The brackets 74 are each attached to the arm 52 between ends 56,58 with bolts.

The openers 24 are supported by attaching the bracket 50 to a toolbar of the frame assembly 26. With the fore end 56 of the arm 52 engaging the bracket 50, the spring 64 is preferably compressed so that the spring force holds the arm 52 in an engagement position and causes the opener 24 to exert a yieldable downforce on the ground. As the arm 52 rotates generally upwardly out of the engagement position, the spring force increases progressively. In the usual manner, this construction permits the opener 24 to shift upwardly when the disc, or another part of the opener 24, contacts a hard obstacle along the ground G (e.g., to minimize any damage to the opener 24 or another part of seeder 20).

The disc assembly 38 is configured to open the furrow F and includes a rotatable disc 78 mounted on a shaft 80. The shaft 80 is rotatably received by the arm 52 so that the disc 78 is rotatable, in the usual manner, about a shaft axis. The shaft 80 is positioned so that the disc 78 is preferably oriented with an oblique fixed disc angle between the disc 78 and a fore-and-aft travel axis of the opener 24 that ranges from about five (5) degrees to about seven (7) degrees. Furthermore, the shaft 80 may be positioned so that the disc 78 extends at an angle relative to vertical. Generally, the shaft 80 is also preferably mounted so that the disc 78 is restricted from sliding along the shaft axis.

The gauge wheel assembly 46 is adjustable so that the bottom dead center BDC location of the disc 78 can be moved to adjust the depth D of furrow F (see FIGS. 13 and 14). Again, the depth D preferably ranges between about one and one-half inches (1½) and about four and one-half (4½) inches and, more preferably, ranges between about three and three-quarters (3¾) inches and about four and one-half (4½) inches. Preferably, the disc 78 has an outermost diameter dimension of about 22.75 inches. Additionally, the disc 78 is preferably made of high-carbon steel with a Rockwell C-Scale Hardness of 50. As the disc 78 opens the furrow F, a zone of disturbed soil Z is created and trails the leading edge of the disc 78 (see FIG. 14). The orientation of the disc 78 creates a shadow area SA behind the disc 78 as the disc 78 is pulled in the forward direction (see FIG. 3).

Figure 7:
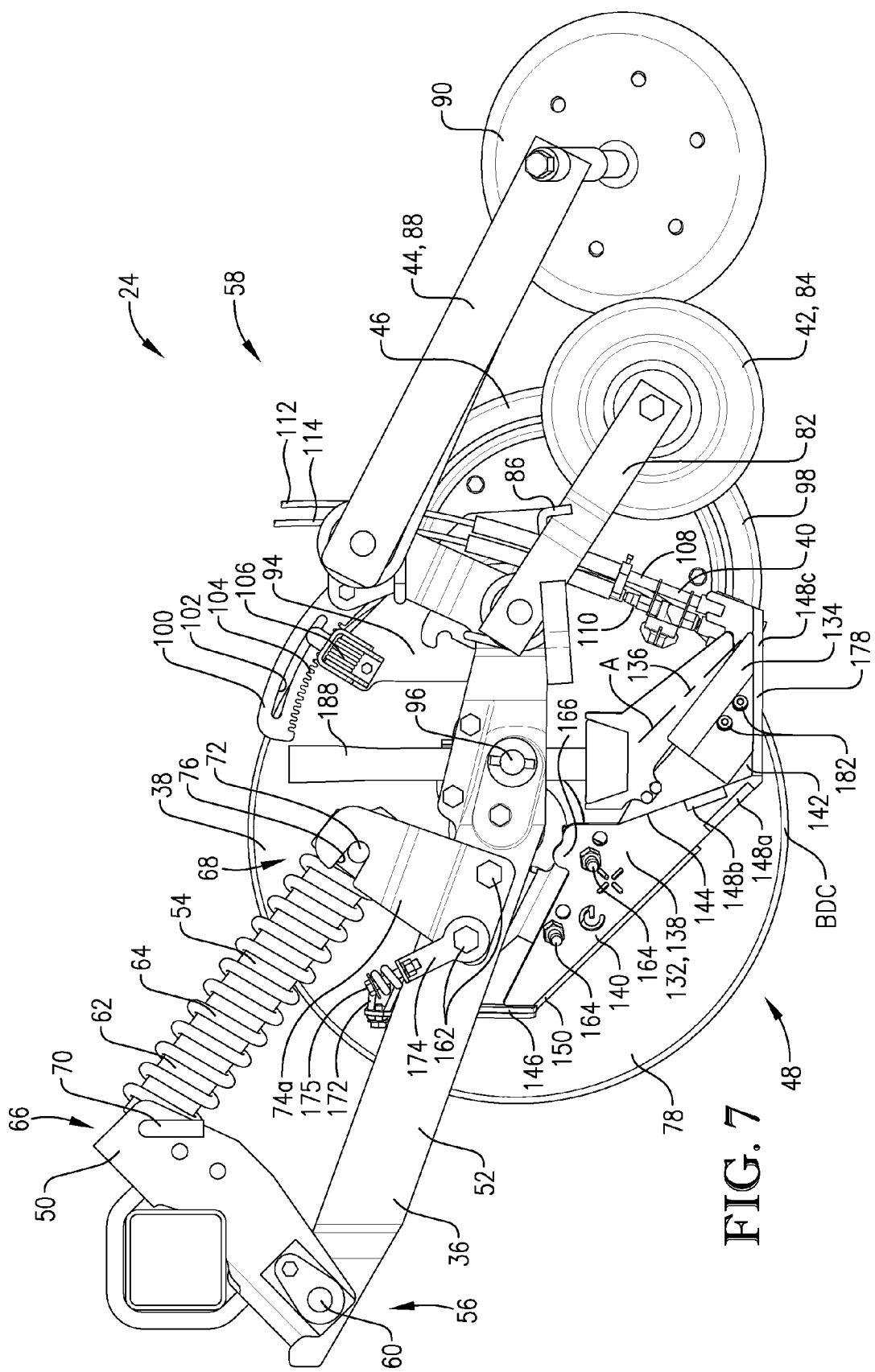
FIG. 7 is a left side elevation of the single disc opener shown in FIGS. 2 and 4-6.

Turning to FIGS. 4 and 7, the firming wheel assembly 42 is pulled along seed bed SB to firmly press the seed S into the top soil along the seed bed SB (see FIG. 2). The firming wheel assembly 42 includes an elongated arm 82, firming wheel 84, and a torsion spring 86. The arm 82 is pivotally mounted adjacent a fore end thereof to the arm 52 with a firming wheel shaft. The wheel 84 is rotatably mounted to the arm 82 adjacent an aft end thereof. The spring 86 is mounted on the firming wheel shaft, with one of end of the spring 86 engaging a top edge of the arm 52 and the other end of the spring 86 engaging a top edge of the arm 82. Thus, the spring 86 urges the firming wheel 84 downwardly into the field G.

In the usual manner, the closing wheel assembly 44 is operable to return soil to the furrow F and thereby close the furrow F. The closing wheel assembly 44 includes an elongated arm 88, closing wheel 90, and a torsion spring 92. The arm 88 is pivotally mounted adjacent a fore end thereof to the aft end 58 of the arm 52 with a closing wheel shaft. The wheel 90 is rotatably mounted to the arm 88 adjacent an aft end thereof. The spring 92 is mounted on the firming wheel shaft, with one of end of the spring 92 engaging an upright edge of the arm 52 (see FIG. 4) and the other end of the spring 86 engaging a top edge of the arm 88 (see FIG. 2). The spring 92 urges the closing wheel 90 downwardly into engagement with the field G.

The gauge wheel assembly 46 is operable to maintain the height of the disc 78 (to control the furrow depth D) and the floating placement assembly 48 relative to field G. The gauge wheel assembly 46 includes a pivotal frame 94 pivotally mounted to the arm 52 with a pin 96, a gauge wheel 98 rotatably mounted to the frame 94, and a bracket 100. The gauge wheel 98 is supported by the frame 94 so that the wheel 98 can be selectively vertically positioned relative to the remainder of the opener 24. The bracket 100 is attached to the arm 52 adjacent the aft end 58 and presents a slot 102 and teeth 104 (see FIGS. 4 and 7). The frame 94 includes a pin that slidably engages the slot 102. A locking device 106 is attached to the frame 94 and selectively engages the teeth 104 to lock the frame 94 into one of multiple positions relative to the bracket 100 and thereby lock the gauge wheel 98 in a corresponding vertical position relative to the arm 52.

Figure 12:
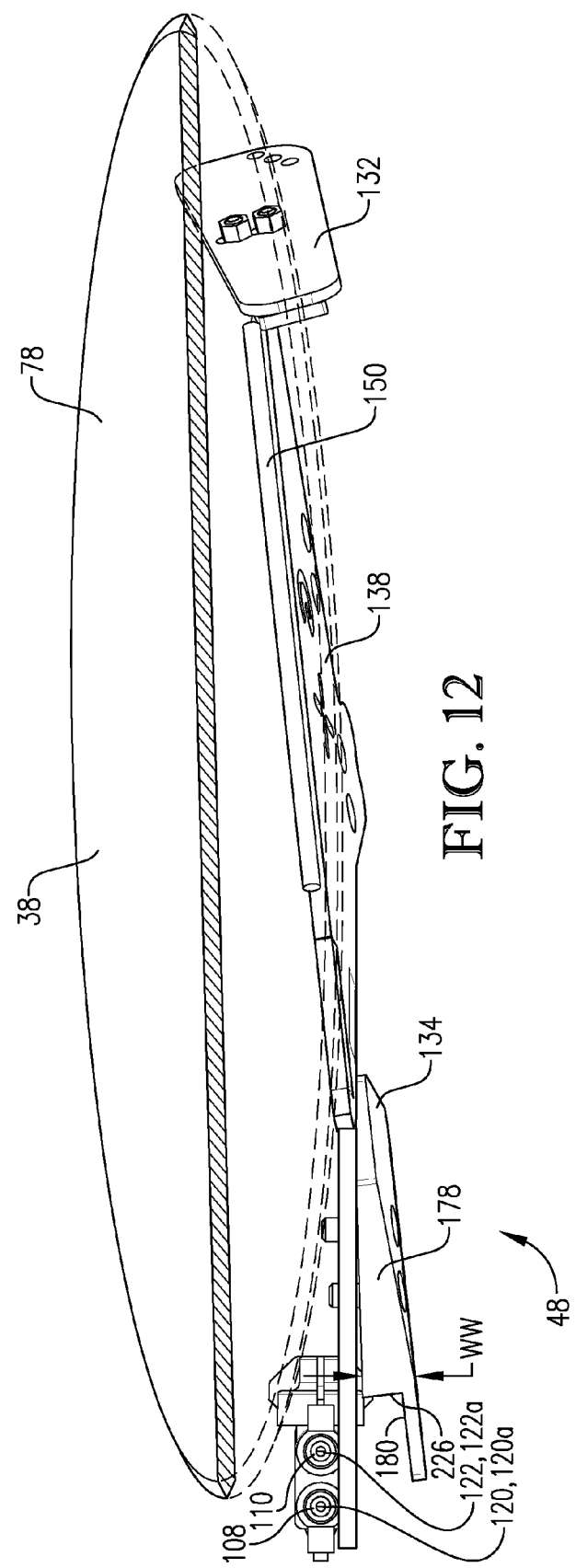
FIG. 12 is a fragmentary bottom view of the disc assembly, support frame, firming wedge, and fertilizer injector assembly shown in FIGS. 2 and 4-7.

The drawbar assembly 36 brackets to one of the toolbars of the frame assembly 26 and thereby pulls the other components of the opener 14b behind the toolbar while yieldably biasing the components downwardly into firm engagement with the field G. The disc 78 of the disc assembly 38 is rotatably supported and engages the field G when in an operating position, i.e., when the gauge wheel 98 engages the ground G. When in the operating position, as the disc 78 is pulled in a forward direction (e.g., left-to-right as viewed in FIG. 1 and in the direction of the arrow as shown in FIG. 3), the disc 78 cuts through the field G thereby fracturing the ground and creating the elongated furrow F therein (see FIGS. 11 and 12). The disc 78 is adjustable relative to the gauge wheel 98 to adjust the depth of the bottom dead center of the disc 78 relative to the surface of the ground G. In this manner, the depth of the furrow F, as controlled by the bottom dead center position of the disc 20, can be adjusted to one of several different depth settings. Preferably, the depth ranges between about one and one-half (1½) inches and about four and one-half (4½) inches. As shown in FIG. 13, the leading edge of the disc 20 is angled relative to the forward direction of travel.

Turning to FIGS. 3-8, the fertilizer injector assembly 40 is operable to place fertilizers N and P in a single, dedicated fertilizer band DB (see FIG. 3). In particular, the fertilizer injector assembly 40 includes a generally wingless injector that provides precise placement of nutrients along a fertilizer bed FB along furrow F (see FIG. 14). That is, the fertilizer injector assembly 40 preferably does not include an injector wing that creates the fertilizer bed. However, for some aspects of the present invention, the assembly 40 could include an injector wing. Features of a preferred injector wing are disclosed in U.S. Pat. No. 7,152,539, issued Dec. 26, 2006, entitled FERTILIZER INJECTOR WING FOR DISC OPENERS, which is hereby incorporated in its entirety by reference herein. The fertilizer injector assembly 40 preferably includes a toxic injector 108 and a non-toxic injector 110. The injectors 108,110 include respective supply lines 112,114, sheaths 116,118, and nozzles 120,122 (see FIGS. 5 and 6).

The toxic fertilizer injector 108 injects the toxic fertilizer N, preferably in the form of anhydrous ammonia, into the bottom of furrow F. The supply line 112 fluidly communicates the nozzle 120 with a fertilizer tank 124 stored on the cart 22 (see FIG. 1). In one manner known in the art, the illustrated tank 124 stores a quantity of anhydrous ammonia N (either gas or liquid) and delivers it through a manifold 126 disposed along the supply line 112 under a controlled pressure to the nozzle 120 where it is injected as liquid anhydrous ammonia N into the furrow F. The incorporated '681 patent and '049 patent (see below) disclose a suitable anhydrous ammonia delivery system including a manifold. The supply line 112 preferably includes a nylon-type line. Adjacent to nozzle 120, the supply line 112 is preferably covered and protected by sheath 116.

The nozzle 120 of injector 108 includes a terminal orifice 120a that is configured to inject liquid anhydrous ammonia. In particular, the orifice 120a alters or maintains the pressure of the fertilizer N below and/or above the vapor pressure of the fertilizer N. Additional details of such a nozzle and orifice are disclosed in U.S. Pat. Nos. 6,360,681 and 6,283,049, both of which are hereby incorporated in their entire by reference herein.

The non-toxic fertilizer injector 110 injects the non-toxic fertilizer P into the furrow F. The supply line 114 fluidly communicates the nozzle 122 with a fertilizer tank 128 stored on the tractor T (see FIG. 1). In one manner known in the art, the illustrated tank 128 stores a quantity of fertilizer P and delivers it through a manifold 130 disposed along the supply line 114 under a controlled pressure to the nozzle 122 where it is injected into the furrow F. The supply line 114 preferably includes a nylon-type line. Adjacent to nozzle 122, the supply line 114 is covered and protected by sheath 118.

The illustrated injector 110 is preferably configured to inject fertilizer P in the form of a blended mixture of liquid ammonium phosphate (APP) and liquid ammonium thiosulfate (ATS). In one manner known in the art, the nozzle 122 includes a terminal orifice 122a configured to inject the liquid APP/ATS mixture under pressure. The terminal orifice 122a preferably presents a larger cross-sectional area than the orifice 120a of the injector 108 to accommodate the different pressure requirements of the fertilizers N and P.

In the illustrated arrangement, the nozzle 120 is positioned to trail the nozzle 122 and be inline therewith so as to place the fertilizers N and P in the single, dedicated fertilizer band DB (see FIG. 3). The illustrated nozzles 120,122 are preferably attached to an aft end of and is thereby shiftable with the placement assembly 48, although the nozzles could be alternatively supported behind the disc assembly. The nozzles 120,122 and the rear margin of the placement assembly 48 preferably present a banding width dimension BW that ranges from about one-half (0.5) inch to about one (1) inch and, more preferably, is about three-quarters (0.75) of an inch (see FIG. 13). Consequently, the liquid APP/ATS mixture is injected in front of the liquid anhydrous ammonia application. The liquid anhydrous ammonia is injected at a high pressure and driven into the APP/ATS mixture to crystallize and form triammonium polyphosphate sulfate (TAPPS). It has been found that TAPPS is the most plant-available form of placed nitrogen, phosphorus, sulfur and zinc and is preferably formulated in the field.

Turning to FIGS. 4-14, the floating placement assembly 48 precisely deposits fertilizer and seed along the furrow F. As will be discussed, the floating placement assembly 48 is preferably shiftably mounted on the arm 52 so as to operate as a scraper for the rotatable disc 78. However, for some aspects of the present invention, the assembly 48 could be used to direct fertilizer and/or seed along the furrow F without engaging the disc 78. The floating placement assembly 48 preferably includes a support assembly 132, a firming wedge 134, and a vented seed catch pan 136.

Turning to FIGS. 5-8, the support assembly 132 supports the injectors 108,110, firming wedge 134, and seed catch pan 136 adjacent the rotatable disc 78. The support assembly 132 includes a support frame 138 with fore and aft plates 140,142 welded to one another along weld line 144, a front lug 146 welded to the front end of plate 140, inserts 148a,b,c, and a wear rod 150. As will be shown, the fore plate 140 is attached to the wear rod 150 and supports the wear rod 150 in engagement with disc 78 so that the wear rod 150 provides a leading edge of the support frame 138. The aft plate 142 extends at an angle relative to the plane of fore plate 140. The aft plate 142 supports the insert 148c and injectors 108,110, and the aft plate 142 also serves to hold the furrow F open, as will be discussed below. Furthermore, the insert 148c provides a trailing edge of the support frame 138.

Preferably, the plates 140,142 have a thickness of one-quarter (¼) inch and are preferably made of A-36 carbon steel, although the plates 140,142 could include other materials and be alternatively sized. Inserts 148 comprise narrow, generally rectangular strips of material fixed to the plates 140,142. The inserts 148 are preferably made of a very hard material so that the inserts 148 resist wear. Preferably, the inserts 148 include chrome or chrome carbide, but could include other materials. The inserts 148 are secured within corresponding slots presented by plates 140,142.

The wear rod 150 is preferably made of a material that is relatively soft compared to the material of disc 78. More preferably, the wear rod 150 is made of "304" stainless steel with a Rockwell B-Scale hardness of 30. Preferably, the support frame 138 is substantially rigid so that the frame 138 can be used as a scraper for the rotatable disc 78. However, for some aspects of the present invention, the frame 138 could be spaced from the disc 78. The frame 138 is used as a scraper by slidably engaging the wear rod 150 with the surface of rotatable disc 78, as will be described below.

Turning to FIGS. 5-11, the support assembly 132 further includes a frame mounting bracket 152 and spring 154. The bracket 152 includes a body with offset flanges 156,158 and a pin 160 welded to flange 158. The illustrated bracket 152 is preferably secured to the arm 52 with threaded fasteners 162 that extend through the arm 52, brackets 74, and flange 156.

Figure 8:
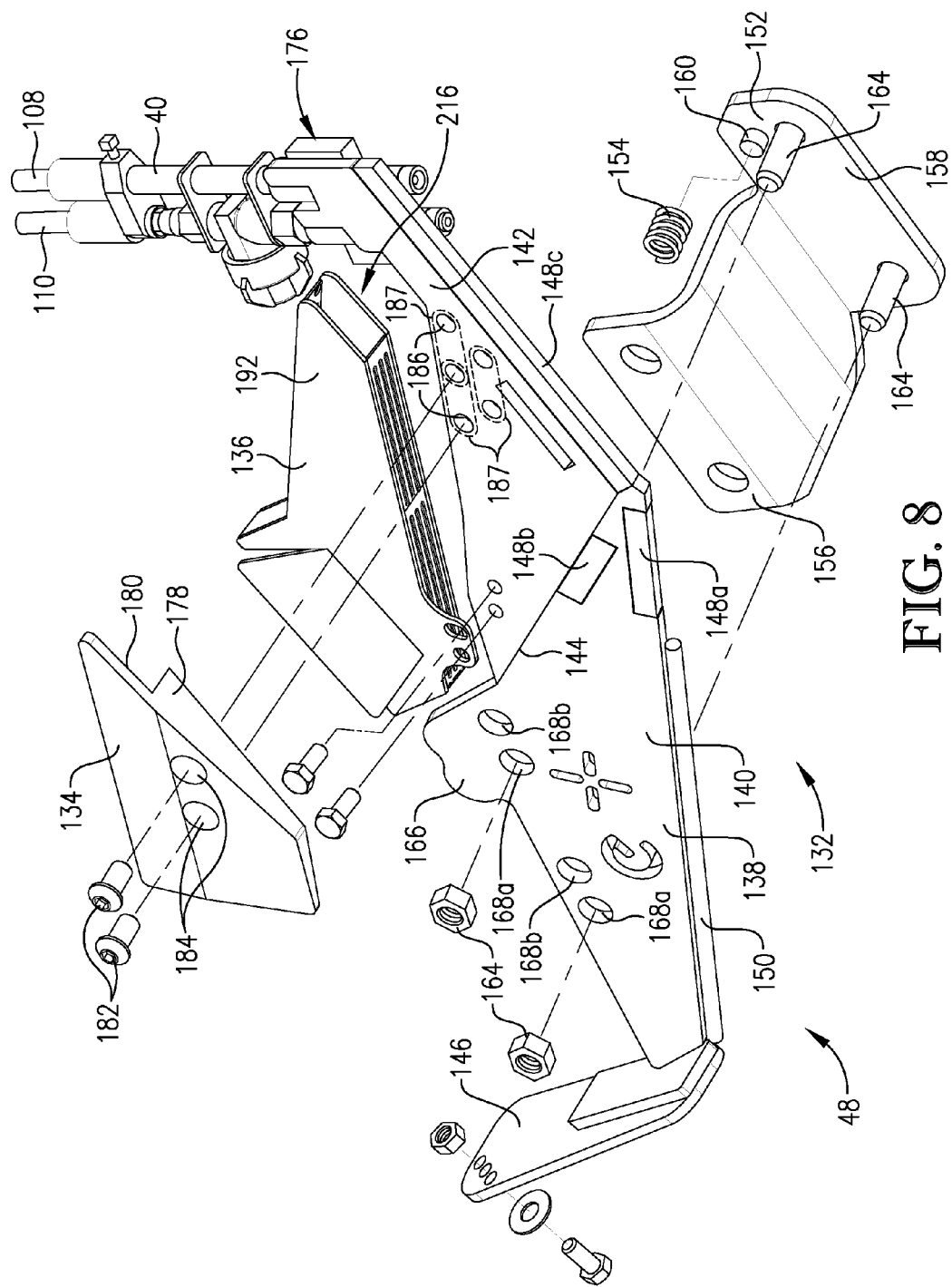
FIG. 8 is a rear left perspective of the floating placement assembly and fertilizer injector assembly shown in FIGS. 2 and 4-7, with a firming wedge, vented seed catch pan, frame mounting bracket, and spring being exploded from a support frame of the placement assembly.

Turning to FIGS. 8 and 9, the bracket 152 and support frame 138 are preferably shiftably connected to one another to permit limited lateral shifting therebetween and thereby allow the support frame 138 to operate as a disc scraper to remove ground debris from the disc surface. The support frame 138 and bracket 152 are secured to one another with threaded fasteners 164. The spring 154 is received on the pin 160 and is thereby positioned between the flange 158 and an upstanding tab 166 of the fore plate 140 (see FIG. 9). The fasteners 164 extend through corresponding sets of holes 168a,b in the fore plate 140. The set of holes 168a serve to position the support frame 138 in a rearward location relative to the arm 52, while the set of holes 168b serve to position the support frame 138 in a forward location relative to the arm 52 (see FIG. 8).

The holes 168 are generally oversized relative to the size of fasteners 164 so that the holes 168 and fasteners 164 provide a joint 170 that allows some off-axis pivoting of the fasteners 164 within the holes 168 (see FIG. 9). Furthermore, the fasteners 164 are secured so that the joint 170 permits some lateral movement of the fore plate 140 along the axis of fasteners 164. With the fasteners 164 secured, the spring 154 urges the support frame 138 away from the flange 158. Furthermore, the spring 154 generally urges a lower portion of fore plate 140 (i.e., below the fasteners 164) away from the arm 52.

The support assembly 132 also preferably includes an elastic rope 172. The rope 172 preferably interconnects a lug 174 attached to the arm 52 and the front lug 146. The illustrated lug 174 includes opposite perpendicular flanges, with one flange attached to the arm by fastener 162 and the other flange receiving a lug fastener 175 around which the rope 172 is secured under tension. In this manner, the rope 172 provides a spring element that urges the lug 146 toward the arm 52 and the lower portion of fore plate 140 away from the arm 52. The rope 172 is adjustably tensioned by rotating the lug 174 about the lug fastener or by looping the rope 172 an additional turn about the lug 174. Thus, the spring 154 and rope 172 cooperatively provide a spring force that urges the lower portion of plate 140 away from the arm 52 so that the wear rod 150 is generally forced into engagement with the rotatable disc 78. However, for some aspects of the present invention, the support assembly 132 could be used without the elastic rope 172, i.e., when the spring 154 provides adequate spring force to urge the wear rod 150 toward the rotatable disc 78. Furthermore, the support assembly 132 could have an alternative spring mechanism to hold the wear rod 150 in engagement with the rotatable disc 78.

Generally, the support frame 138 is positioned so that an aft portion of wear rod 150 engages the rotatable disc 78. In particular, a front end of wear rod 150 is spaced slightly from the rotatable disc 78, and the wear rod 150 extends rearwardly toward a convergence location C of the frame 138 and the rotatable disc 78. Thus, the wear rod 150 is positioned so that the wear rod 150 extends into engagement with the rotatable disc 78 along the aft portion, which extends forwardly of the convergence location C. Preferably, the convergence location C is preferably about two (2) inches behind the bottom dead center location BDC. Such positioning of the support frame 138 serves to locate the support frame 138 more centrally relative to the shadow area SA. In this manner, the illustrated configuration has been found to allow a trailing edge of the support frame 138 to remain in the furrow F while the opener 24 is turned through a relatively small-radius turn. In turn, it has been discovered that such a configuration minimizes wear of the support frame 138 within the furrow F. The location of the leading edge above the convergence location C allows the rod 150 to wear quickly so that the leading edge can quickly become sealed along the rotatable disc 178 (see FIG. 4).

Again, the fasteners 164 and holes 168 are configured to permit some off-axis pivoting of the fasteners 164 within the holes 168 and to allow some lateral movement of the fore plate 140. The rod 150 is designed to wear from prolonged sliding engagement with the rotatable disc 78. Thus, the rod 150 wears so that the leading edge serves as a sharp scraper edge. As the rod 150 wears, the joint 170 allows the support frame 138 to flex so that the rod 150 can remain in sliding contact with the rotatable disc 78.

The aft plate 142 is positioned so that a lower margin thereof extends into the furrow F and the trailing edge of the support frame 138 is positioned in the furrow F. The aft plate 142 runs along the furrow F adjacent the slot St to hold the seed shelf in place as the slot St is formed by the wedge 134 and to restrict soil from falling into the bottom part of furrow F. The aft plate 142 also runs adjacent the slot St so that the support frame 138 restricts seed S from dropping into the furrow F. Preferably, the trailing edge is positioned below a lowermost edge of wedge 134 a distance that ranges from about three-quarters (0.75) of an inch to about one and a quarter (1.25) inches. Furthermore, the trailing edge is preferably laterally spaced from the rotatable disc 78.

As mentioned above, the support frame 138 preferably supports the injectors 108,110. The injectors 108,110 are preferably attached to the aft end of aft plate 142 with holder 176 (see FIGS. 6 and 8). The toxic injector 108 is preferably positioned in front of non-toxic injector 110. As discussed, the nozzles 120,122 inject the liquid APP/ATS mixture and the liquid anhydrous ammonia application to form the TAPPS band. Preferably, the TAPPS band is located at a fertilizer depth dimension FD that ranges from about three and three-quarters (3.75) inches to about five (5) inches (see FIG. 14). Furthermore, depending on the location of the firming wedge 134 on the support frame 138, the TAPPS band is preferably spaced alongside the seed S at a lateral spacing dimension that ranges from about three-quarters (0.75) of an inch to about one (1) inch and a vertical spacing dimension that ranges from about one and three-quarters (1.75) inches to about two and one-half (2.5) inches.

Turning to FIGS. 4-7 and 12-16, the firming wedge 134 and seed catch pan 136 are removably secured to support frame 138 and serve to position seed along the shelf of slot St. Preferably, the wedge 134 comprises a solid unitary body that presents a lowermost edge 178 and an angled groove 180 that extends from an uppermost extent of the wedge 134 to the lowermost edge 178 (see FIG. 16). The wedge 134 preferably has a wedge width dimension WW that ranges from about one-half (0.5) inch to about one (1) inch and, more preferably, is either about three-quarters (0.75) of an inch or about one (1) inch (see FIG. 12). The wedge 134 preferably includes chrome or chrome carbide so that the wedge 134 resists wear, but the wedge 134 could include other materials.

The wedge 134 is preferably removably secured to aft plate 142 by extending fasteners 182 through holes 184 in the wedge 134 and threading the fasteners 182 into corresponding threaded holes 186 in the aft plate 142 (see FIG. 8). The holes 186 are located to provide three distinct wedge-mounting locations 187. The wedge 134 is generally positioned within the shadow area SA, although a laterally outermost edge of firming wedge 134 is located outside of the shadow area SA a dimension that ranges from about zero (0) inches to about one-half (0.5) inch.

As the wedge 134 is pulled through the field G by the support frame 138, the wedge 134 forms the slot St within furrow F and thereby prepares the seed bed SB. In particular, the wedge 134 preferably bulges soil B along the side of furrow F in a lateral direction away from furrow F to form the slot St, including the shelf that receives seed S (see FIG. 13). It has been found that the formation of slot St by bulging the soil laterally, rather than cutting into the soil, produces a mound of bulged soil B that tends to fall back into the slot St after the seed S has been pressed into the seed bed SB by the firming wheel. Preferably, the wedge 134 is positioned so that the lowermost edge 178 forms the bottom of slot St with a slot depth dimension of about two (2) inches, although the slot could have an alternative depth.

The firming wedge 134 is preferably removably attached to the support frame 138 although, for some aspects of the present invention, the wedge 134 could be fixed to the support frame 138. Also, the wedge 134 could be attached to another component of the opener 24, e.g., where the wedge 134 is attached directly to catch pan 136.

Figure 5:
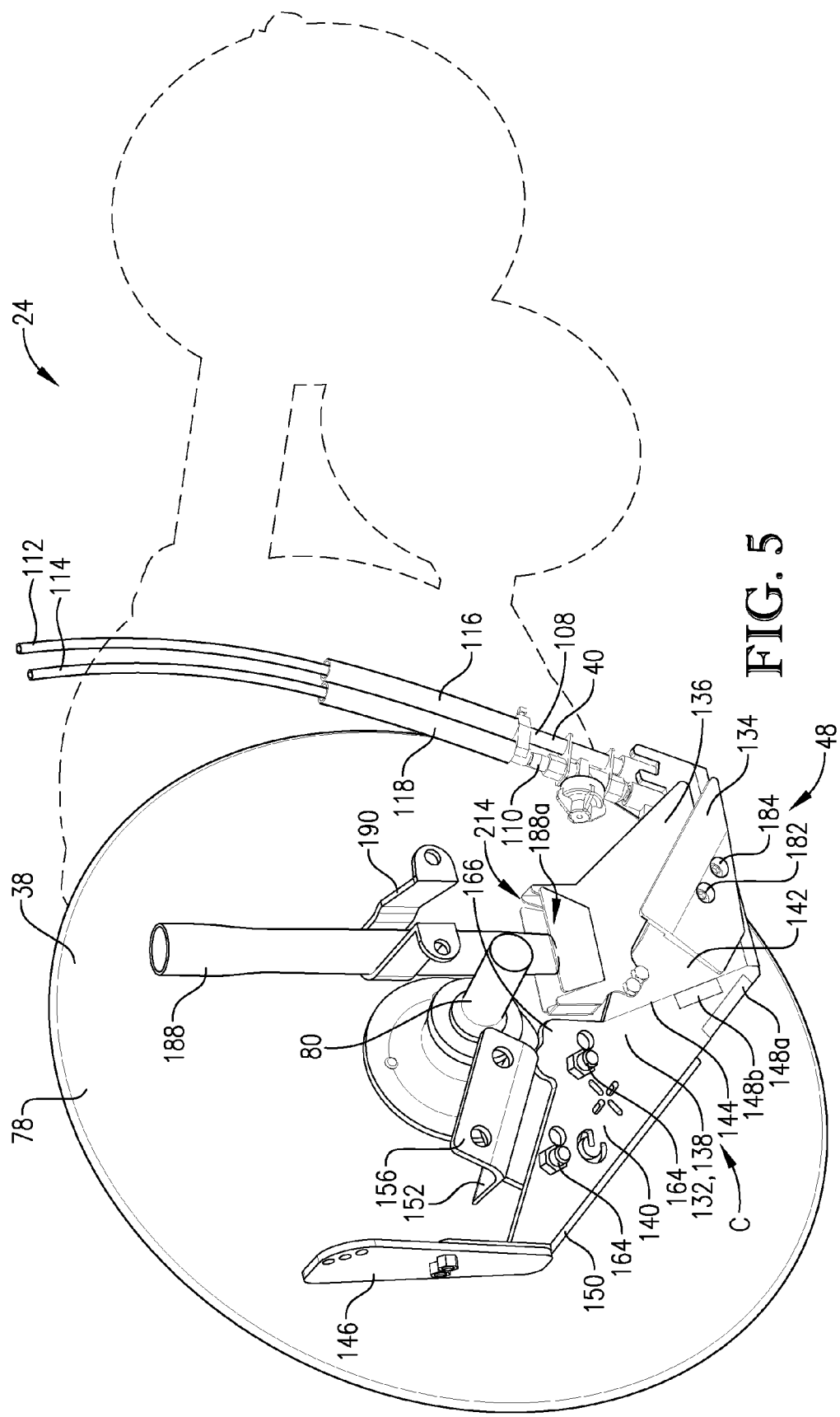
FIG. 5 is a fragmentary front left perspective of the single disc opener shown in FIGS. 2 and 4, showing the disc assembly, fertilizer injector assembly, and floating placement assembly.
Figure 6:
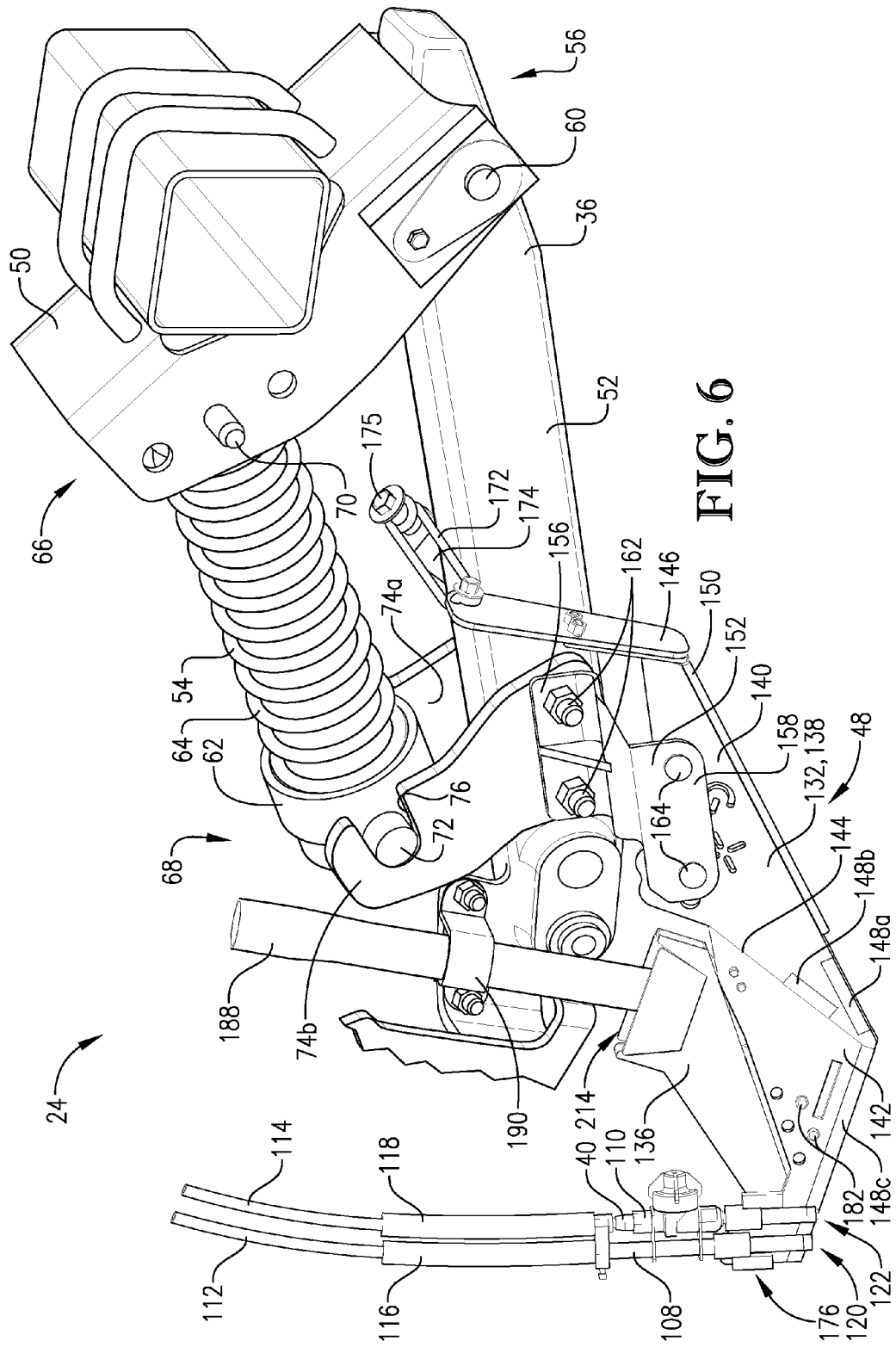
FIG. 6 is a fragmentary front right perspective of the single disc opener shown in FIGS. 2, 4, and 5, showing the drawbar assembly, fertilizer injector assembly, and floating placement assembly.

Turning to FIGS. 5 and 6, the catch pan 136 distributes seed S received from the seed tank 32 via a seed tube 188. The seed tube 188 is secured to the arm 52 by a bracket 190. The illustrated seed tube 188 presents an outlet 188a that is positioned within the catch pan 136. In the illustrated embodiment, the seed tube 188 is provided by cutting an original equipment seed tube to remove a lowermost section below the location of outlet 188a. For instance, the lowermost four and one half (4½) inches of the seed tube from a Case SDX seeder are preferably removed to provide the illustrated opener. However, for some aspects of the present invention, the seed tube 188 could be provided with the illustrated length and configuration as part of an original equipment opener.

Turning to FIGS. 15 and 16, the catch pan 136 preferably includes side walls 192,194, and fore and aft walls 196,198. The side walls 192,194 are preferably unitary and have a width dimension (measured along a fore-and-aft direction) that generally tapers from an upper funnel section 200 of the catch pan 136 to a rearwardly declining section 202 of the catch pan 136. The fore wall 196 includes an upper continuous portion 204 and a lower vented portion 206. The aft wall 198 also includes an upper continuous portion 208 and a lower vented portion 210. The walls 192,194,196,198 preferably are made from 14-gauge A36 carbon steel, but could include other materials.

The vented portions 206,210 preferably include a respective plurality of elongated slots 212*a,b* that present a slot width dimension Ws. The illustrated slots 212 include three rows of slots, with two slots arranged end-to-end in each row. However, the slots 212 could be alternatively positioned, e.g., to provide improved venting of the catch pan 136. The slot width dimension Ws for slots 212 preferably ranges from about 0.030 inches to about 0.100 inches. The slot width dimension Ws for forward-facing slots 212*a* is preferably less than the slot width dimension Ws for rearward-facing slots 212*b* so that the fore wall 196 provides greater restriction than aft wall 198 to seed S becoming clogged in the corresponding slots 212*a* or foreign matter becoming clogged in slots 212*a* (e.g., due to soil impingement on pan 136 as the opener is moved forwardly). More preferably, the slot width dimension Ws for slots 212*a* ranges from about 0.09 inches to about 0.10 inches, and the slot width dimension Ws for slots 212*b* ranges from about 0.08 inches to about 0.09 inches in the illustrated embodiment. It has been found that clogging of slots 212, particularly of forward-facing slots 212*a*, with seed or foreign matter can harmfully restrict venting of the catch pan 136 so that the catch pan 136 becomes less effective at minimizing seed bounce. The above-noted dimensions have been found to be critical for minimizing clogging of slots 212, particularly for larger seeds such as wheat. The material between adjacent slots 212 preferably has a width of about 0.077 inches.

The walls 192,194,196,198 are interconnected to form an inlet 214 and outlet 216 connected by an elongated chamber 218. The upper ends of side walls 192,194 include flaps 220 that are bent outwardly from the bottom of funnel section 200. Thus, the width dimension of the funnel section 200, as measured between the flaps 220, tapers in the downward direction. In this manner, the inlet 214 is sized to receive the lower end of the seed tube 188, and the funnel section 200 serves to collect seed S as the seed is deposited into the catch pan 136 from the seed tube 188.

The walls 192,194,196,198 along the rearwardly declining section 202 cooperatively define an axis A along the section that extends from the funnel section 200 downwardly and rearwardly (i.e., the axis A is at an oblique angle relative to the field G). The declining section 202 also is preferably configured to have a length dimension (i.e., as measured along the axis A) and a width dimension (as measured transversely to axis A) that tapers progressively from the funnel section 200 to the outlet 216. These features of the declining section 202 have been found to minimize seed bounce when depositing seed S into the furrow F while permitting venting of pressurized air.

The side walls 192,194 and the fore and aft walls 196,198 are preferably constructed so that the catch pan 136 presents a length dimension that ranges from about five (5) inches to about ten (10) inches and, more preferably, is about seven (7) inches.

The outlet 216 is preferably defined by an open bottom 216*a* presented by the declining section 202 and a rearwardly-facing opening 216*b*. The opening 216*b* is defined between the side walls 192,194 and extends upwardly from the open bottom 216*a* to the aft wall 198, with the opening 216*b* extending along a lower margin of the declining section 202 (see FIGS. 15 and 16). The opening 216*b* preferably presents a height dimension that is less than a width dimension thereof. In this manner, the aft wall 198 is positioned to restrict soil from entering the catch pan 136. However, the outlet 216 could be alternatively configured to provide seed distribution without departing from the scope of the present invention. For example, in one alternative catch pan embodiment not depicted herein, the vented portion of aft wall could extend from the funnel section to a location about half way between the funnel section and the open bottom, with the opening extending along the backside of the pan downwardly between the sidewalls from the lower end of the vented portion to the open bottom. In the alternative embodiment, the catch pan could also include a shiftable vented wall portion pivotally attached to the lower end of the vented portion and extending from the vented portion to a location adjacent the open bottom. The shiftable wall portion could be pivotal relative to the vented portion into and out of a covering position where the shiftable wall portion substantially covers the opening.

The outlet 216 preferably presents an outlet width dimension Wo that ranges from about one-quarter (0.25) inch to about three-quarters (0.75) of an inch and, more preferably, is about 0.58 inches in the illustrated embodiment (see FIG. 16). The outlet 216 also preferably presents an outlet length dimension Lo that ranges from about one inch to about two inches and, more preferably, is about one and one-half inches in the illustrated embodiment (see FIG. 15). The above-noted dimensions for the outlet 216 have been found to be particularly effective for distribution of larger seeds, such as wheat.

Preferably, the number and arrangement of slots 212 along with the size of slots 212 permit adequate venting of the pressurized air that transmits seed S to the catch pan 136. However, for some aspects of the present invention, the vents could be alternatively configured, e.g., where the side walls 192,194 include openings to vent air. The vent openings could also take different shapes for some aspects of the present invention. Furthermore, the catch pan 136 could have other alternative configurations, e.g., to minimize seed bounce as the seed is deposited into furrow F, or to otherwise provide precise distribution of seed.

The side wall 192 includes a tab with holes 222,224 that allow the catch pan 136 to be attached to the aft plate 142 with fasteners. The hole 224 is elongated to permit rotation of the catch pan 136 about the axis of hole 222. In this manner, the tab allows fine adjustment of the catch pan position.

The lower end of catch pan 136 is preferably received in the groove 180 of the wedge 134 so that the fore wall 196 is positioned behind the wedge 134. Furthermore, the outlet 216 of catch pan 136 is preferably spaced above the lowermost edge 178. In this manner, the wedge 134 serves to protect the lower margin of catch pan 136 from contact with soil or other objects in field G as the opener is moved forwardly. The fore wall 196 is also positioned behind the wedge 134 so that the wedge serves to restrict clogging of slots 212*a* by foreign matter, e.g., matter that approaches the wedge 134 during forward movement of the opener. Furthermore, the fore wall 196 is preferably spaced rearwardly from a shoulder 226 of the wedge 134 so that the fore wall 196 and wedge 134 cooperatively define an air relief passage 228 (see FIGS. 13 and 16). Thus, the passage 228 allows air to vent forwardly from the chamber 218 through the fore wall 196.

Preferably, the catch pan 136 is removably attached to the support frame 138. In the illustrated embodiment, the firming wedge 134 and catch pan 136 are both preferably removable from the opener 24 so that the opener 24 can be used as a banding opener, e.g., for pre-plant banding. However, for some aspects of the present invention, the firming wedge 134 and catch pan 136 could be fixed to the opener 24. Furthermore, it is within the ambit of the present invention where the entire support frame 138 is generally fixed relative to the arm 52 to support the firming wedge 134 and catch pan 136 in a fixed position relative to the arm 52 (e.g., where support frame 138 is not used as a disc-scraping mechanism).

The illustrated catch pan 136 is preferably positioned with the nozzles 120,122 located laterally between the catch pan 136 and the disc 78. Furthermore, the catch pan 136 and nozzles 120,122 are preferably located at least partly between laterally outermost edges of the disc 78 when the opener is viewed along a fore-and-aft direction. Thus, the catch pan 136 and nozzles 120,122 are at least partly positioned within a lateral disc profile. The catch pan 136 is also positioned so that the catch pan outlet is located behind the scraper edge formed by wear rod 150.

In operation, the tractor T pulls the air seeder 20 along the field G to distribute seed and fertilizer with minimal soil disturbance. With the openers 24 in the operating position, the gauge wheel 98 rolls along the field G, and the disc 78 cuts the furrow F. At the same time, the aft plate 142 and injectors 108,110 ride within the furrow F. Thus, the injectors 108,110 provide a dual-shot application of nitrogen, phosphorus, sulfur, and/or zinc in the furrow F as the opener 24 is pulled behind the toolbar. Furthermore, the firming wedge 134 forms the slot St with the outlet 216 of catch pan 136 behind the wedge 134. Seed S is deposited into the slot St and comes to rest on the seed shelf so that the firming wheel can press the seed S into the seed bed SB. The soil displaced along slot St is generally moved by the firming wedge 134 so that the displaced soil falls back into the slot St after the seed S is deposited in the seed bed SB. Thus, the floating placement assembly 48 is operable to distribute seed S within the slot St and control the placement of the dedicated fertilizer band as the opener 24 is pulled behind the toolbar.

Turning to FIGS. 17 and 18, an alternative vented seed catch pan 300 is constructed in accordance with a second embodiment of the present invention. For the sake of brevity, the remaining description will focus primarily on the differences of this alternative embodiment from the embodiment described above.

The alternative catch pan 300 includes side walls 302,304, and fore and aft walls 306,308. The side walls 302,304 are preferably unitary and have a width dimension (measured along a fore-and-aft direction) that generally tapers from an upper funnel section 310 to a rearwardly declining section 312. The fore wall 306 includes an upper continuous portion 314 and a lower vented portion 316. The aft wall 308 also includes an upper continuous portion 318 and a lower vented portion 320.

The vented portions 316,320 preferably include a plurality of elongated slots 322a,b that present a slot width dimension Ws. The illustrated slots 322 on each section 316,320 include three slots that extend alongside one another, with the middle slot being longer than the slots on opposite ends. Preferably, the slot width dimension Ws for slots 322a is less than the slot width dimension Ws for slots 322b. More preferably, the slot width dimension Ws for slots 322a ranges from about 0.030 inches to about 0.040 inches, and the slot width dimension Ws for slots 322b ranges from about 0.040 inches to about 0.050 inches in the illustrated embodiment. The above-noted dimensions have been found to be critical for minimizing clogging of slots 322, particularly for smaller seeds such as mustard.

The walls 302,304,306,308 are interconnected to form an inlet 324 and outlet 326 connected by an elongated chamber 328. The upper ends of side walls 302,304 include flaps 330 that are bent outwardly from the bottom of funnel section 310. Thus, the width dimension of the funnel section 310, as measured between the flaps 330, tapers in the downward direction. In this manner, the inlet 324 is sized to receive the lower end of the seed tube, and the funnel section 310 serves to collect seed S as the seed is deposited into the catch pan 300 from the seed tube.

The outlet 326 preferably presents an outlet width dimension that is about 0.265 inches in the illustrated embodiment. The outlet 326 also preferably presents an outlet length dimension that ranges from about one (1) inch to about two (2) inches and, more preferably, is about one and one-half (1½) inches in the illustrated embodiment. The alternative catch pan 300 generally operates in the same manner as the previously described catch pan embodiments.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A furrow opener operable as part of a nonsingulating air seeder, said furrow opener comprising:
    a rotatable disc operable to be pulled over ground in a forward direction to thereby open a furrow; and
    a vented seed catch pan positioned adjacent one side of the disc and being operable to insert seed in the furrow,
    said vented seed catch pan configured to be operably coupled to a seed conduit of the air seeder to receive seed in a pressurized air flow from the seed conduit,
    said vented seed catch pan presenting a seed inlet configured to receive seed from the seed conduit, a seed outlet positioned to deposit the seed within the furrow, and an elongated chamber extending between the inlet and outlet,
    said vented seed catch pan presenting multiple vents spaced between the inlet and outlet,
    said vents being positioned between the inlet and outlet and thereby allowing pressurized air flow to escape from the chamber to ambient without passing through the outlet,
    said vents including forward-facing vents and rearward-facing vents,
    said vents each presenting a lateral vent dimension, with the lateral vent dimension of the forward-facing vents being smaller than the lateral vent dimension of the rearward-facing vents.

2. The furrow opener as claimed in claim 1,
    said vented seed catch pan including a downwardly-tapering funnel section and a rearwardly declining section that depends from the funnel section,
    said vents extending along the rearwardly declining section.

3. The furrow opener as claimed in claim 2,
    said rearwardly declining section defining a portion of the elongated chamber that extends generally downwardly and rearwardly to the seed outlet to define a chamber axis positioned at an oblique angle relative to vertical, with the rearwardly declining section thereby operable to minimize seed bounce.

4. A furrow opener operable as part of a nonsingulating air seeder, said furrow opener comprising:
- a rotatable disc operable to be pulled over ground in a forward direction to thereby open a furrow; and
- a vented seed catch pan positioned adjacent one side of the disc and being operable to insert seed in the furrow,
- said vented seed catch pan configured to be operably coupled to a seed conduit of the air seeder to receive seed in a pressurized air flow from the seed conduit,
- said vented seed catch pan presenting a seed inlet configured to receive seed from the seed conduit, a seed outlet positioned to deposit the seed within the furrow, and an elongated chamber extending between the inlet and outlet,
- said vented seed catch pan presenting multiple vents spaced between the inlet and outlet,
- said vents being positioned between the inlet and outlet and thereby allowing pressurized air flow to escape from the chamber to ambient without passing through the outlet,
- said vented seed catch pan including a downwardly-tapering funnel section and a rearwardly declining section that depends from the funnel section,
- said vents including forward-facing vents and rearward-facing vents, with the vents extending along the rearwardly declining section,
- said sections being defined by front and rear walls and side walls that extend between the front and rear walls,
- said front wall presenting the forward-facing vents and said rear wall presenting the rearward-facing vents.

5. The furrow opener as claimed in claim 4; and
- a soil firming element attached relative to and located in front of the vented seed catch pan along the forward direction,
- said firming element operable to be moved through the ground to form a soil shelf on which seed is deposited from the vented seed catch pan outlet,
- said front wall being positioned behind the soil firming element so that the soil firming element restricts clogging of the forward-facing vents.

6. The furrow opener as claimed in claim 5,
- said soil firming element presenting a shoulder spaced in front of the front wall, with the shoulder and front wall defining a relief passage that at least partly extends along the forward-facing vents and permits pressurized air flow to pass through the forward-facing vents adjacent the soil firming element.

7. A furrow opener operable as part of a nonsingulating air seeder, said furrow opener comprising:
- a rotatable disc operable to be pulled over ground in a forward direction to thereby open a furrow; and
- a vented seed catch pan positioned adjacent one side of the disc and being operable to insert seed in the furrow,
- said vented seed catch pan configured to be operably coupled to a seed conduit of the air seeder to receive seed in a pressurized air flow from the seed conduit,
- said vented seed catch pan presenting a seed inlet configured to receive seed from the seed conduit, a seed outlet positioned to deposit the seed within the furrow, and an elongated chamber extending between the inlet and outlet,
- said vented seed catch pan presenting multiple vents spaced between the inlet and outlet,
- said vents being positioned between the inlet and outlet and thereby allowing pressurized air flow to escape from the chamber to ambient without passing through the outlet,
- a fertilizer injector nozzle operable to inject a fertilizer band into the ground,
- said fertilizer injector nozzle being located laterally between the vented seed catch pan and the rotatable disc,
- said vented seed catch pan and rotatable disc presenting rearwardmost margins thereof, with the fertilizer injector nozzle located along a fore-and-aft direction adjacent the rearwardmost margins.

8. The furrow opener as claimed in claim 7, said rotatable disc being oriented at an oblique angle relative to the forward direction, said rotatable disc including laterally outermost edges that define a lateral disc profile, said vented seed catch pan and said nozzle being at least partly located within the lateral disc profile.

9. The furrow opener as claimed in claim 7;
- a drawbar assembly that supports the rotatable disc; and
- a scraper assembly including a floating scraper shiftably mounted relative to the drawbar assembly,
- said scraper being yieldably biased into a scraping relationship with the rotatable disc.

10. The furrow opener as claimed in claim 9; and
- a soil firming element attached relative to and located in front of the vented seed catch pan along the forward direction,
- said firming element operable to be moved through the ground to form a soil shelf on which seed is deposited from the vented seed catch pan outlet,
- said vented seed catch pan and said soil firming element being mounted to the floating scraper for shifting movement therewith.

11. The furrow opener as claimed in claim 9,
- said vented seed catch pan being mounted to the floating scraper so that the scraper is positioned between the vented seed catch pan and rotatable disc.

12. A furrow opener operable as part of a nonsingulating air seeder, said furrow opener comprising:
- a rotatable disc operable to be pulled over ground in a forward direction to thereby open a furrow; and
- a vented seed catch pan positioned adjacent one side of the disc and being operable to insert seed in the furrow,
- said vented seed catch pan configured to be operably coupled to a seed conduit of the air seeder to receive seed in a pressurized air flow from the seed conduit, said vented seed catch pan presenting a seed inlet configured to receive seed from the seed conduit, a seed outlet positioned to deposit the seed within the furrow, and an elongated chamber extending between the inlet and outlet,
- said vented seed catch pan presenting multiple vents spaced between the inlet and outlet,
- said vents being positioned between the inlet and outlet and thereby allowing pressurized air flow to escape from the chamber to ambient without passing through the outlet,
- said vented seed catch pan presenting an open bottom and an opening extending along a lower rear margin of the vented seed catch pan, with the open bottom and opening cooperatively defining the outlet,
- said vented seed catch pan including a rear plate that at least partly defines the opening and is operable to direct seed toward the outlet while restricting soil from entering the chamber.

13. The furrow opener as claimed in claim 12; and
- a soil firming element attached relative to and located in front of the vented seed catch pan along the forward direction,
- said soil firming element operable to be moved through the ground to form a soil shelf on which seed is deposited from the vented seed catch pan outlet.

14. The furrow opener as claimed in claim 13;
a drawbar assembly that supports the rotatable disc; and
a fertilizer injector nozzle operable to inject a fertilizer band into the ground,
said soil firming element and said vented seed catch pan being removably attached to the drawbar assembly so that the furrow opener is configurable for fertilizer banding without simultaneous air seeding.

15. The furrow opener as claimed in claim 13,
said soil firming element projecting below the seed outlet.

16. The furrow opener as claimed in claim 15,
said soil firming element projecting laterally outward beyond the rotatable disc and seed outlet.

17. A furrow opener operable as part of a nonsingulating air seeder, said furrow opener comprising:
a rotatable disc operable to be pulled over ground in a forward direction to thereby open a furrow; and
a vented seed catch pan positioned adjacent one side of the disc and being operable to insert seed in the furrow,
said vented seed catch pan configured to be operably coupled to a seed conduit of the air seeder to receive seed in a pressurized air flow from the seed conduit,
said vented seed catch pan presenting a seed inlet configured to receive seed from the seed conduit, a seed outlet positioned to deposit the seed within the furrow, and an elongated chamber extending between the inlet and outlet,
said vented seed catch pan presenting multiple vents spaced between the inlet and outlet,
said vents being positioned between the inlet and outlet and thereby allowing pressurized air flow to escape from the chamber to ambient without passing through the outlet,
said vented seed catch pan including an upper transition section and a lower venting section that depends from the transition section, with the vents being presented by the lower venting section,
said upper transition section presenting a downwardly tapering width dimension so that the upper transition section is operable to funnel seed to the lower venting section.

18. The furrow opener as claimed in claim 17,
said lower venting section declining in a direction along the forward direction from the upper transition section.

19. The furrow opener as claimed in claim 17, said upper transition section and said lower venting section being defined by front and rear walls and side walls that extend between the front and rear walls.

20. A furrow opener operable as part of a nonsingulating air seeder, said furrow opener comprising:
a rotatable disc operable to be pulled over ground in a forward direction to thereby open a furrow; and
a vented seed catch pan positioned adjacent one side of the disc and being operable to insert seed in the furrow,
said vented seed catch pan configured to be operably coupled to a seed conduit of the air seeder to receive seed in a pressurized air flow from the seed conduit,
said vented seed catch pan presenting a seed inlet configured to receive seed from the seed conduit, a seed outlet positioned to deposit the seed within the furrow, and an elongated chamber extending between the inlet and outlet,
said vented seed catch pan presenting multiple vents spaced between the inlet and outlet,
said vents being positioned between the inlet and outlet and thereby allowing pressurized air flow to escape from the chamber to ambient without passing through the outlet,
said vented seed catch pan including an upper transition section and a lower venting section that depends from the transition section, with the vents being presented by the lower venting section,
said upper transition section and said lower venting section being defined by front and rear walls and side walls that extend between the front and rear walls,
said vents including forward-facing vents and rearward-facing vents,
said front wall presenting the forward-facing vents and said rear wall presenting the rearward-facing vents.

* * * * *